United States Patent
Seng et al.

(10) Patent No.: US 6,456,213 B1
(45) Date of Patent: Sep. 24, 2002

(54) DIGITIZING READBACK WAVEFORM FOR TESTING HARD DISC DRIVES

(75) Inventors: Edmun ChianSong Seng; UttHeng Kan, both of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/330,649

(22) Filed: Jun. 11, 1999

Related U.S. Application Data

(60) Provisional application No. 60/089,012, filed on Jun. 11, 1998.

(51) Int. Cl.$^7$ ................................................ H03M 1/00
(52) U.S. Cl. ........................ 341/126; 360/31; 360/135
(58) Field of Search ................................ 341/155, 156, 341/140, 126, 116, 129, 128; 360/51, 135, 75, 46, 31, 77.08

(56) References Cited

U.S. PATENT DOCUMENTS

| | | | |
|---|---|---|---|
| 5,341,249 A | 8/1994 | Abbott et al. | 360/46 |
| 5,416,646 A | 5/1995 | Shirai | 360/46 |
| 5,422,760 A | 6/1995 | Abbott et al. | 360/46 |
| 5,430,584 A | 7/1995 | Peterson | 360/78.04 |
| 5,450,253 A | 9/1995 | Seki | 360/65 |
| 5,465,343 A | 11/1995 | Henson et al. | 395/439 |
| 5,559,983 A | 9/1996 | Masood | 395/439 |
| 5,586,306 A | 12/1996 | Romano et al. | 395/500 |
| 5,771,131 A * | 6/1998 | Pirzadeh | 360/77.08 |
| 5,801,896 A | 9/1998 | Freitas | 360/77.08 |
| 5,860,089 A | 1/1999 | Ishii | 711/112 |
| 5,978,426 A | 11/1999 | Glover et al. | 375/376 |
| 5,999,355 A | 12/1999 | Behrens et al. | 360/65 |
| 6,084,754 A * | 7/2000 | Smith et al. | 360/135 |
| 6,088,176 A * | 7/2000 | Smith et al. | 360/46 |
| 6,154,335 A * | 11/2000 | Smith et al. | 360/75 |
| 6,178,056 B1 * | 1/2001 | Cloke et al. | 360/46 |
| 6,278,568 B1 * | 8/2001 | Cloke et al. | 360/51 |
| 6,288,856 B1 * | 9/2001 | Ottesen et al. | 360/31 |

OTHER PUBLICATIONS

Chopra, K., et al., "A Maximum Likelihood Peak Detecting Channel", *IEEE Transactions on Magnetics*, vol. 27, No. 6, pp. 4819–4821, (Nov., 1991).

Coker, J.D., et al., "Implementation of PRML in a Rigid Disk Drive", *IEEE Transactions on Magnetics*, vol. 27, No. 6, pp. 4538–4543, (Nov., 1991).

Fredrickson, L.J., "Viterbi Detection of Matched Spectral Null Codes for PR4 Systems", *IEEE Transactions on Magnetics*, vol. 28, No. 5, pp. 2889–2891, (Sep., 1992).

Patel, A.M., et al., "A New Digital Processing Channel for Data Storage Products", *IEEE Transactions on Magnetics*, vol. 27, No. 6, pp. 4579–4584, (Nov., 1991).

* cited by examiner

*Primary Examiner*—Brian Young
*Assistant Examiner*—John Nguyen
(74) *Attorney, Agent, or Firm*—Kirk A. Cesari; Derek J. Berger

(57) ABSTRACT

Information handling systems, disc drives, and methods for digitizing a readback waveform for testing a hard disc drive are disclosed. An information handling system, such as a disc drive, includes a base, a disc stack rotatably attached to the base, and an actuator assembly movably attached to the base. Attached to one end of the actuator assembly is one or more transducers. Attached to the other end of the actuator is a voice coil that forms a portion of a voice coil motor. Magnets attached to the base form the other portion of the voice coil motor. An analog readback signal is reconstructed for use in testing a disc drive by digitizing a waveform generated within a read channel arrangement to produce digitized waveform data. The analog readback signal is then determined as a function of the digitized waveform data.

19 Claims, 4 Drawing Sheets

DIGITIZING READBACK WAVEFORM FOR TESTING HARD DISC DRIVES

RELATED APPLICATION

This application claims the benefit;of U.S. Provisional Application Ser. No. 60/089,012, filed Jun. 11, 1998 under 35 U.S.C. § 119(e).

FIELD OF THE INVENTION

The present invention relates to the field of mass storage devices. More particularly, the present invention relates to testing hard disc drives during the manufacturing process.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved from and written to the disc surface. A microprocessor controls most of the operations of the disc drive, including passing the data back to the requesting computer and taking data from a requesting computer for storing to the disc.

The transducer is typically housed within the slider. The slider is a small ceramic block that is passed over the disc in a transducing relationship with the disc. The small ceramic block, also referred to as a slider, is usually aerodynamically designed so that is flies over the disc. Most sliders have an air bearing surface ("ABS"), which includes rails and a cavity between the rails. When the disc rotates, air is dragged between the rails and the disc surface, causing pressure, which forces the head away from the disc. At the same time, the air rushing past the depression in the air bearing;surface produces a negative pressure area. The negative pressure or suction counteracts the pressure produced at the rails. The slider is also attached to a load spring that produces a force on the slider directed toward the disc surface. The various forces equilibrate so that the slider flies over the surface of the disc at a particular fly height. The fly height is the thickness of the air lubrication film or the distance between the disc surface and the transducing head. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data from a memory disc is accomplished by positioning the read/write head above a target track and reading the stored material on the memory disc. To write to or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

In hard drive manufacturing environments, one of the most significant criteria that determines drive performance is the soft error rate of the drive. In order to ensure that the drive satisfies soft error rate criteria, a number of conventional test procedures have been implemented in the process flow.

According to one conventional test procedure, a new drive is tested on a head parametric tester at the beginning of a test process to screen out bad heads. This screening process helps ensure that only drives with good heads pass to the next stage, at which a drive optimization test is performed. Finally, an error rate test is performed. In this procedure, therefore, the head parametric testing stage filters out drives with bad heads to ensure that most of the drives that pass it will also pass the error rate test. While quality control is reasonable using this test procedure, the head parametric test increases manufacturing costs significantly.

In another conventional test procedure, a new drive is initially optimized during the drive optimization test, and head parametric testing is omitted. After the drive optimization test, the error rate test is performed. In this procedure, drives with bad heads are screened during the error rate test. While this procedure is also effective in controlling quality, substantial overhead in testing time is introduced as potentially many drives with bad heads are unnecessarily subjected to error rate testing. In many cases, other screening procedures, such as head parametric testing, would have prevented these drives from being subjected to error rate testing.

The condition of the drive head can also be determined by studying a readback waveform from the hard drive preamplifier. This approach involves the use of an external instrument, such as an oscilloscope. While using external instruments is suitable for laboratory or bench testing, it is not suitable for mass production environments, which require testing of a large number of drives.

Accordingly, a need continues to exist for a cost-efficient, accurate, and reliable method of determining the condition of the drive head.

SUMMARY OF THE INVENTION

The present invention is related to methods and arrangements for solving the above-mentioned problems by facilitating examination of a digitized readback waveform from the drive itself.

By using this readback waveform to characterize the drive, the condition of the head can be ascertained inexpensively and accurately. In addition, this technique is easily implemented by modifying the existing drive test firmware in the manufacturing environment. Accordingly, no new system hardware is required to implement the present invention.

One particular embodiment is directed to a method for reconstructing an analog readback signal for use in testing a disc drive. This method includes the steps of digitizing a waveform generated within a read channel arrangement to produce digitized waveform data and determining the analog readback signal as a function of the digitized waveform data. Another embodiment is directed to an information handling system implementing this method.

According to still another embodiment of the present invention, a disc drive has a base, a disc rotatably attached to the base, and an actuator attached to the base. One end of the actuator has a transducer, and the other end of the actuator has a voice coil that forms a portion of a voice coil motor. A read channel arrangement is configured to digitize a waveform generated within itself to produce digitized waveform data and to determine an analog readback signal as a function of the digitized waveform data.

These and various other features as well as advantages that characterize the present invention will be apparent upon reading the following detailed description and reviewing the associated drawings.

DETAILED DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1:
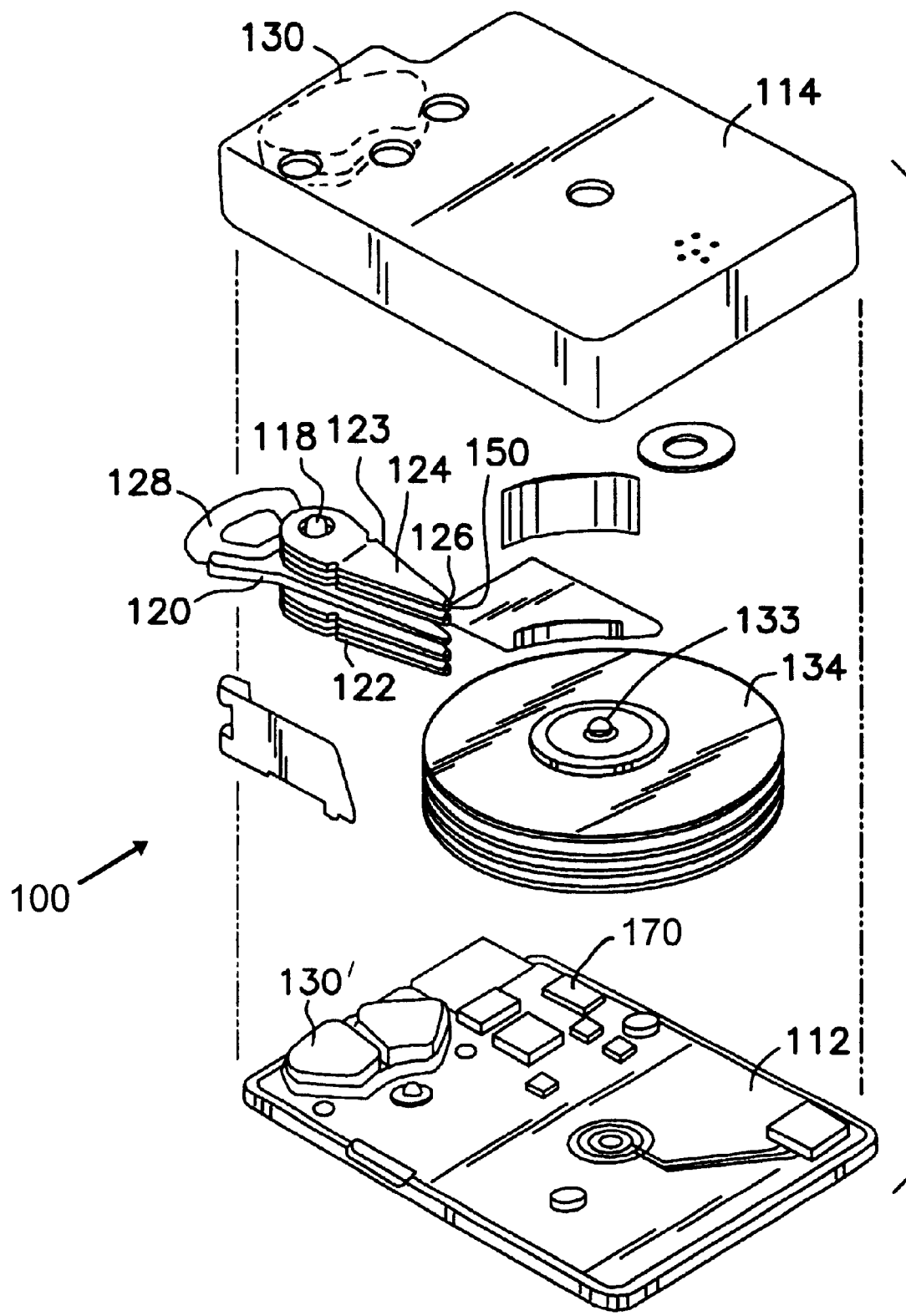
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful for all types of disc drives, including hard disc drives, ZIP drives, floppy disc drives, and any other type of drive where unloading the transducer from a surface and parking the transducer may be desirable. Referring now to the drawings, FIG. 1 is an exploded view of one type of a disc drive 100 having a rotary actuator. The disc drive 100 includes a housing or base 112 and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122 are load beams or load springs 124. Load beams or load springs are also referred to as suspensions. Attached at the end of each load spring 124 is a slider 126 that carries a magnetic transducer 150. The slider 126 with the transducer 150 form what is many times called the head. It should be noted that many sliders have one transducer 150; this arrangement is shown in the figures. It should also be noted that this invention is equally applicable to sliders having more than one transducer, such as what is referred to as an MR or magnetoresistive head, in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 130'. As shown in FIG. 1, the second magnet 130' is associated with the cover 114. The first and second magnets 130, 130', and the voice coil 128 are the key components of a voice coil motor that applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs ray be attached to the hub. The invention described herein is equally applicable to disc drives that have a plurality of discs as well as disc drives that have a single disc. The invention described herein is also equally applicable to disc drives with spindle motors that are within the hub 133 or under the hub. Also shown are disc drive electronics 170, which include a read channel circuit 200. The disc drive electronics 170 can be housed within the disc drive, as shown, or on a printed circuit board attached to the base 112 of the disc drive 100.

Figure 2:
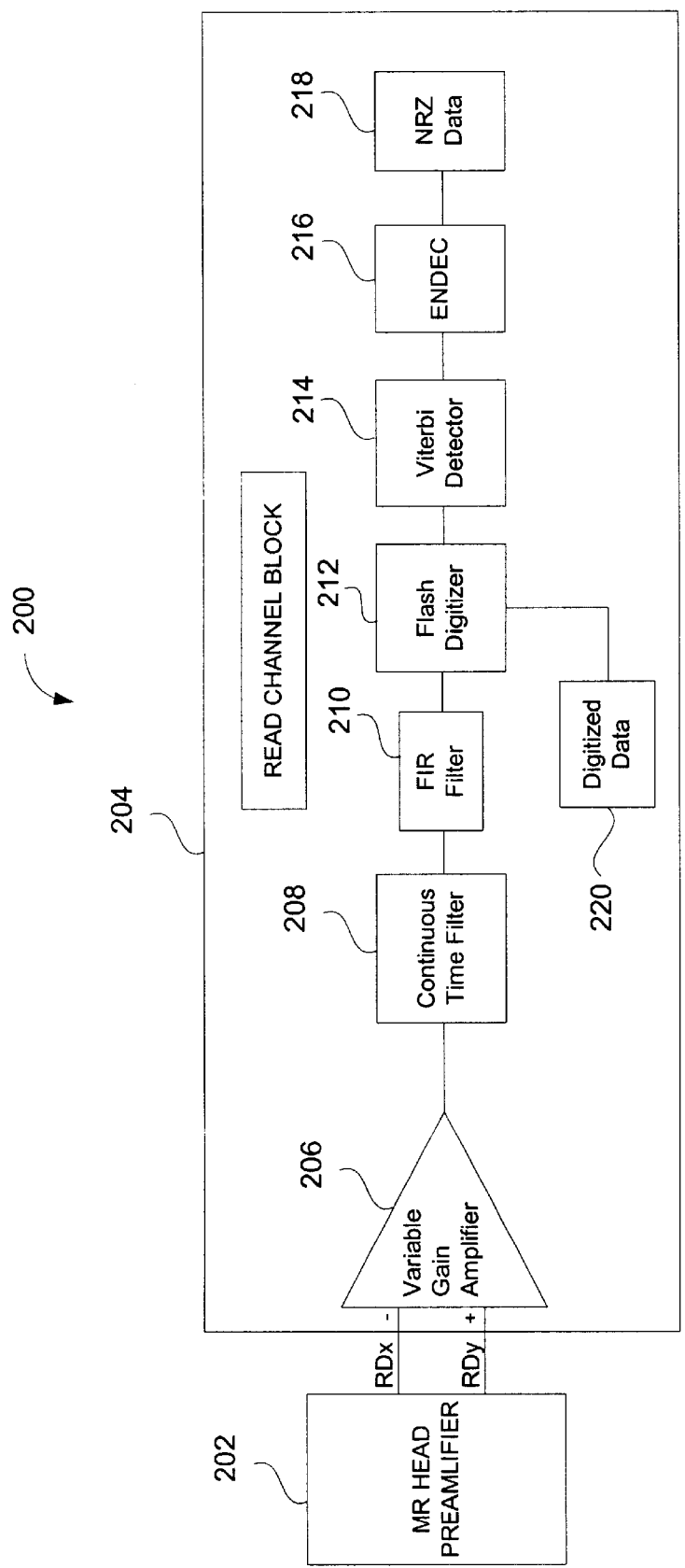
FIG. 2 is a block diagram illustrating a read channel circuit arrangement for extracting and recreating a readback signal from a hard disc, according to one example embodiment of the present invention.

FIG. 2 is a block diagram depicting the read channel circuit arrangement 200 for extracting and recreating a readback signal from a hard disc, according to one example embodiment of the present invention. A magnetoresistive ("MR") head preamplifier 202 receives an analog readback signal and provides it to a read channel arrangement 204 as input signals RDx and RDy.

Within the read channel arrangement 204, a variable gain amplifier ("VGA") 206 receives and amplifies the difference between differential input signals RDx and RDy, providing the amplified signal to a continuous time filter ("CTF") 208. The CTF 208 filters the signal and provides it to a finite impulse response ("FIR") filter 210, which, in conventional applications, shapes the filtered signal to a waveform that is appropriate for the particular type of channel used in the system. For example, for some types of channels, a PR4 waveform is appropriate, while, in others, an EPR4 waveform is better suited. The shaped waveform is then digitized by a digitizer, depicted in FIG. 2 as a flash digitizer 212. While any suitable type of digitizer can be employed, flash digitizers are particularly well-suited for applications involving high-speed analog-to-digital conversion. Other types of digitizers that can be used include, but are not limited to, five- and seven-bit analog-to-digital converters. The choice of a particular type of digitizer is informed by the channel type. A Viterbi detector 214 and an encoder/decoder ("ENDEC") 216 further process the digitized waveform to produce the final Non Return to Zero ("NRZ") encoded data, in which "zero" bits are represented by a voltage of zero volts and "one" bits are represented by some positive voltage. The NRZ encoded data is denoted by reference numeral 218.

According to one particular embodiment of the present invention, digitized waveform data, depicted in FIG. 2 at reference numeral 220, is extracted from the flash digitizer 212. This data is then accumulated to recreate the analog readback signal. To improve the accuracy of recreating the analog readback signal, the FIR filter 210 is set at a default value to effectively disable it. Disabling the FIR filter 210 prevents the waveform from being shaped and preserves the input signals RDx and RDy in nearly their original waveforms before they are digitized. Certain read channel arrangements provide a second-order non-linearity compensation capability to compensate for MR nonlinearity; any such compensation capability is similarly disabled to preserve the original input waveforms.

In some types of read channel arrangements, the high speed with which the flash digitizer 212 makes it difficult to latch out all of the digitized sample values consecutively. Some types of read channel arrangements 204, for example, allow only one digital sample to be latched out to an external register for collection for every read event, with the capability to set when the sample is to be latched out based on the number of clock cycles from the detection of the synchronization byte. For these types of read channel arrangements, the entire waveform of a sector is digitized and recreated using a time equivalent sampling method, an example of which is conceptually illustrated in FIG. 3.

Figure 3:
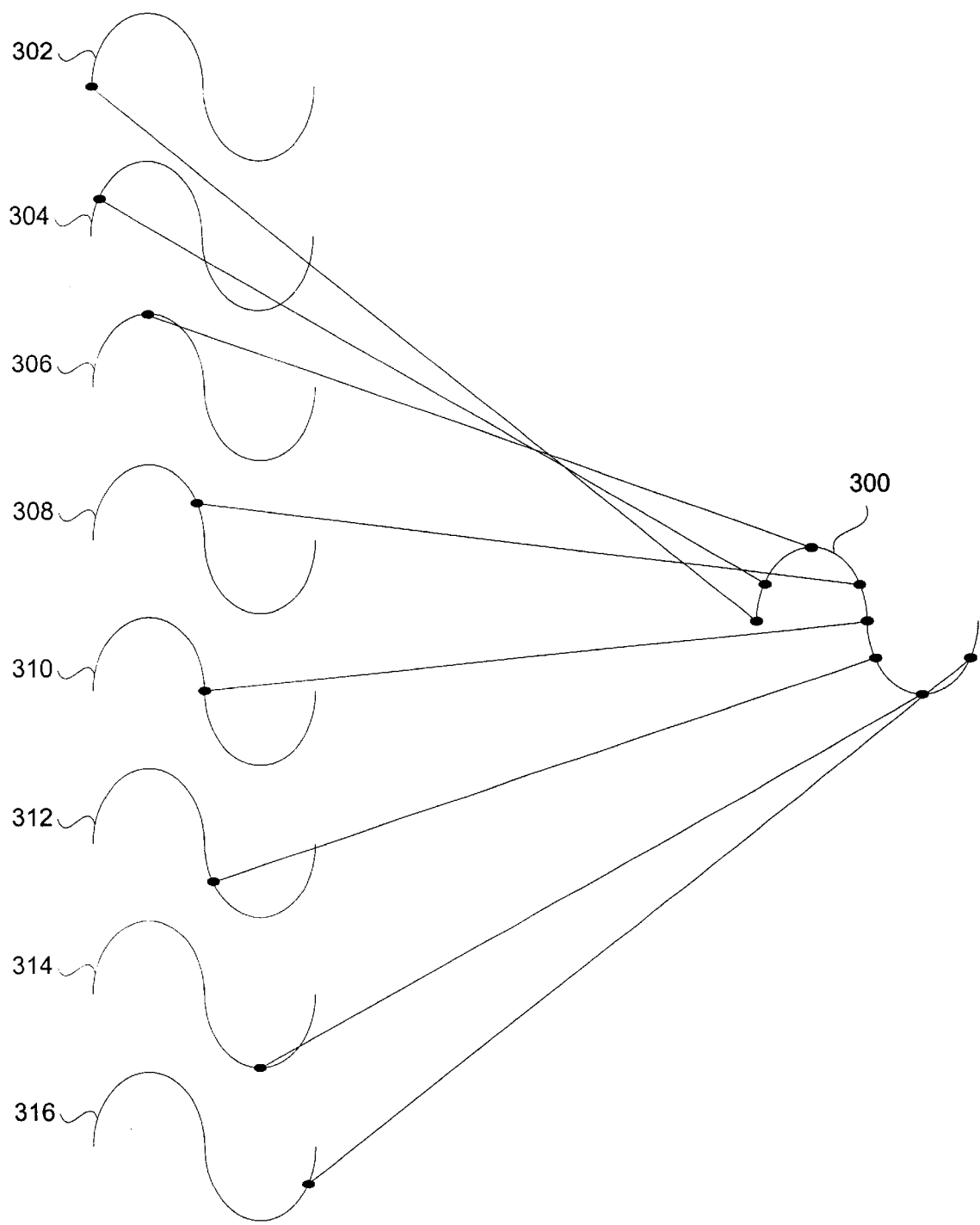
FIG. 3 conceptually illustrates a time equivalent sampling method for use in connection with extracting and recreating a readback signal from a hard disc, according to another embodiment of the present invention.

FIG. 3 shows a series of eight periods of a repetitive waveform to be sampled using a time equivalent sampling method. In this method, the repetitive nature of the waveform allows the waveform to be sampled by taking revolution samples from different periods rather than from a single period. For example, in FIG. 3, the waveform 300 is recreated by taking revolution samples over eight successive, though not necessarily consecutive, periods 302, 304, 306, 308, 310, 312, 314, and 316. A dot on each of these periods indicates the time within each period at which the respective revolution sample is taken. It is readily appreciated that, for each successive period, the particular sampling time is shifted relative to the sampling time for the preceding period. Thus, the first revolution sample is taken from the beginning of the period 302, the fifth revolution sample is taken from the middle of the period 310, and the eighth revolution sample is taken from the end of the period 316. In this particular embodiment, eight samples are used to recreate the original waveform, and eight revolutions or periods are required. It should be noted, however, that a greater or lesser number of samples can be used to recreate the original waveform.

After the waveform is recreated, it is analyzed to determine the ratio of positive peak voltage to negative peak voltage; this ratio is known in the art as the symmetry value. In determining the symmetry value of an MR head, a low frequency pattern, e.g., 16T, where T represents the read channel clock period, is written to a sector on a test track, such as track 0. A low frequency pattern is desirable for preventing intersymbol interference that is predominant at high frequencies. Further, using a low frequency pattern ensures a flat response from the CTF 208, which is typically programmed to have a boost at high frequencies. Thus, using a low frequency pattern improves the accuracy of determining the symmetry value.

The symmetry value of an MR head indicates the linearity of its operation. Because it is desirable for an MR head to operate in as linear a manner as possible in a disc drive, a non-symmetric value indicates a bad head that should be screened out. The symmetry value can also be stored in the drive for tracking purposes. Unstable MR heads exhibit inconsistent symmetry values. Accordingly, symmetry values can be determined at regular intervals to monitor the stability of the MR head.

Certain MR heads, such as soft adjacent layer ("SAL") based MR heads, have biasing currents that affect their symmetry values. To ensure that such MR heads are linearly biased, an adaptive biasing current scheme that adapts in response to changing symmetry values can be used. Other types of waveform analysis, such as amplitude measurement, can also be performed instead of or in addition to the symmetry measure described above. It is contemplated that other analyses may be created for testing the head. in addition to those described herein.

Figure 4:
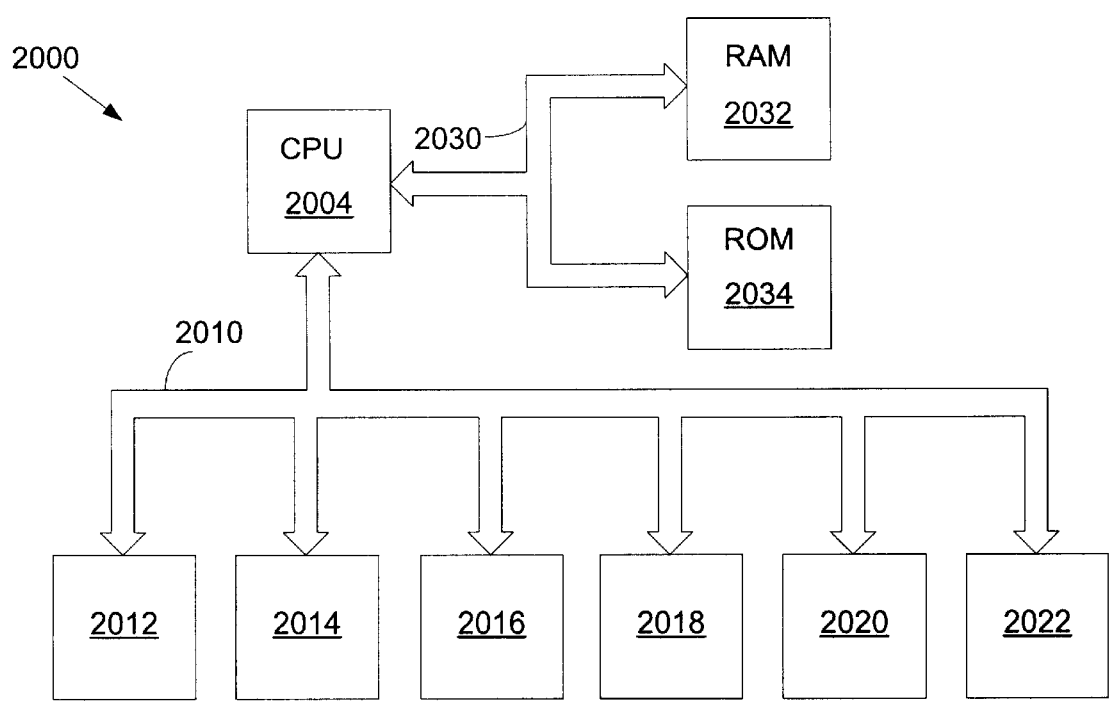
FIG. 4 is a schematic view of a computer system.

FIG. 4 is a schematic view of a computer system. Advantageously, the invention is well-suited for use in a computer system 2000. The computer system 2000 may also be called an electronic system or an information handling system and includes a central processing unit, a memory, and a system bus. The information handling system includes a central processing unit 2004, a random access memory 2032, and a system bus 2030 for communicatively coupling the central processing unit 2004 and the random access memory 2032. The information handling system includes a disc drive device that includes the read channel arrangement described above. The information handling system 2002 may also include an input/output bus 2010 and several peripheral devices, such as 2012, 2014, 2016, 2018, 2020, and 2022, which may be attached to the input/output bus 2010. Peripheral devices may include hard disc drives, magneto-optical drives, floppy disc drives, monitors, keyboards, and other such peripherals. Any type of disc drive may use the method for loading or, unloading the slider onto the disc surface as described above.

Advantageously, using the readback waveform obtained from the digitizer to characterize the drive allows the condition of the head to be ascertained inexpensively and accurately. Further, no new system hardware is required to implement the present invention, which is readily implemented by modifying the existing drive test firmware in the manufacturing environment.

Conclusion

In conclusion, a method for reconstructing an analog readback signal for use in testing a disc drive 100 is disclosed. A waveform generated within a read channel arrangement 204 is digitized, producing digitized waveform data. This digitized waveform data is then used to recreate the analog readback signal. A flash digitizer 212 may be used to digitize the waveform. Further, the analog readback signal can be recreated by sampling digitized waveform data from several periods of the waveform. To improve the accuracy of digitization, the method may include disabling a finite impulse response filter 210 of the read channel arrangement 204. If the read channel arrangement 204 has a nonlinearity compensation capability, this too may be disabled. The determined analog readback signal is optionally used to calculate a symmetry value that characterizes the disc drive. A low frequency pattern may be used to calculate the symmetry value. The symmetry value can be stored using the disc drive. In a particular embodiment, a biasing current of the disc drive is adjusted as a function of the symmetry value. Further, a head of the disc drive may be characterized based at least in part on the digitized waveform data.

Also disclosed is a disc drive 100 including a base 112, a disc 134 rotatably attached to the base 112, and an actuator assembly 120 movably attached to the base 112. The actuator assembly 120 further comprises a voice coil 128 attached to the actuator assembly 120. At least one Magnet 130 is attached to the base 112 and positioned near the voice coil 128 to form, a voice coil motor 128, 130. A read channel arrangement 204 digitizes a waveform generated within itself to produce digitized waveform data and determines an analog readback signal as a function of this digitized waveform data. A flash digitizer 212 can be used to digitize the waveform generated within the read channel arrangement

204. The read channel arrangement 204 can be used to determine the analog readback signal in part by sampling digitized waveform data corresponding to several periods of the waveform generated within the read channel arrangement 204. The disc drive may also include a finite impulse response filter 210 that is disabled for digitizing the waveform generated within the read channel,arrangement 204. Any nonlinearity compensation capability of the read channel arrangement 204 can also be disabled to improve the accuracy of digitizing the waveform generated within the read channel arrangement 204. The determined analog readback signal can be used to calculate a symmetry value that characterizes the disc drive. A low frequency pattern may be used to calculate the symmetry value. The disc can be configured to store the symmetry value. Further, a biasing current of the disc drive is optionally adjusted as a function of the symmetry value.

Also disclosed is an information handling system having a digitizing subsystem for digitizing a waveform generated within a read channel arrangement 204 to produce digitized waveform data and a subsystem for determining an analog readback signal as a function of the digitized waveform data. The information handling system may also include a subsystem for calculating a symmetry value characteristic of the information handling system as a function of the determined analog readback signal.

It is to be understood that, even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the hard disc while maintaining substantially the same functionality without departing from the scope and spirit of the present invention. In addition, although the preferred embodiment described herein is directed to a hard disc for a hard disc drive, it will be appreciated by those skilled in the art that the teachings of the present invention can be applied to other systems, such as removable magnetic media drives, without departing from the scope and spirit of the present invention.

What is claimed is:

1. A method for reconstructing an analog readback signal for use in testing a disc drive, the method comprising steps of:
   (a) digitizing a waveform generated within a read channel arrangement to produce digitized waveform data; and
   (b) determining the analog readback signal as a function of the digitized waveform data by sampling digitized waveform data corresponding to a plurality of periods of the waveform.

2. A method, according to claim 1, wherein the step (a) includes using a flash digitizer to digitize the waveform.

3. A method, according to claim 1, further comprising a step (c) of disabling a finite impulse response filter of the read channel arrangement.

4. A method, according to claim 1, further comprising a step (c) of disabling a nonlinearity compensation capability of the read channel arrangement.

5. A method, according to claim 1, further comprising a step (c) of calculating a symmetry value characteristic of the disc drive as a function of the determined analog readback signal.

6. A method, according to claim 5, wherein the step (c) comprises using a low frequency pattern for calculating the symmetry value.

7. A method, according to claim 5, further comprising a step (c) of storing the symmetry value using the disc drive.

8. A method, according to claim 5, further comprising a step (d) of adjusting a biasing current of the disc drive as a function of the symmetry value.

9. A method, according to claim 1, further comprising a step (c) of characterizing a head of the disc drive based at least in part on the digitized waveform data.

10. A disc drive comprising:
    a base;
    a disc rotatably attached to the base;
    an actuator attached to the base, one end of the actuator having a transducer and another end of the actuator having a voice coil that forms a portion of a voice coil motor; and
    a read channel arrangement configured to digitize a waveform generated within the read channel arrangement to produce digitized waveform data and to determine an analog readback signal as a function of the digitized waveform data, the analog,readback signal being constructed by sampling digitized waveform data corresponding to a plurality of periods of the waveform.

11. A disc drive, according to claim 10, further comprising a flash digitizer configured and arranged to digitize the waveform generated within the read channel arrangement.

12. A disc drive, according to claim 10, further comprising a finite impulse response filter configured and arranged, to be disabled for digitizing the waveform generated within the read channel arrangement.

13. A disc drive, according to claim 10, wherein the read channel arrangement has a nonlinearity compensation capability that is disabled for digitizing the waveform generated within the read channel arrangement.

14. A disc drive, according to claim 10, further comprising a subsystem for calculating a symmetry value characteristic of the disc drive as a function of the determined analog readback signal.

15. A disc drive, according to claim 14, wherein a low frequency pattern is used for calculating the symmetry value.

16. A disc drive, according to claim 14, wherein the disc is configured to store the symmetry value.

17. A disc drive, according to claim 14, further comprising a biasing current adjustment subsystem for adjusting a biasing current of the disc drive as a function of the symmetry value.

18. An information handling system comprising:
    a digitizing subsystem for digitizing a waveform generated within a read channel arrangement to produce digitized waveform data; and
    a subsystem for determining an analog readback signal as a function of the digitized waveform data, the analog readback signal being determined by sampling digitized waveform data corresponding to a plurality of periods of the waveform.

19. An information handling system, according to claim 17, further comprising a subsystem for calculating a symmetry value characteristic of the information handling system as a function of the determined analog readback signal.

* * * * *